United States Patent Office 2,851,502
Patented Sept. 9, 1958

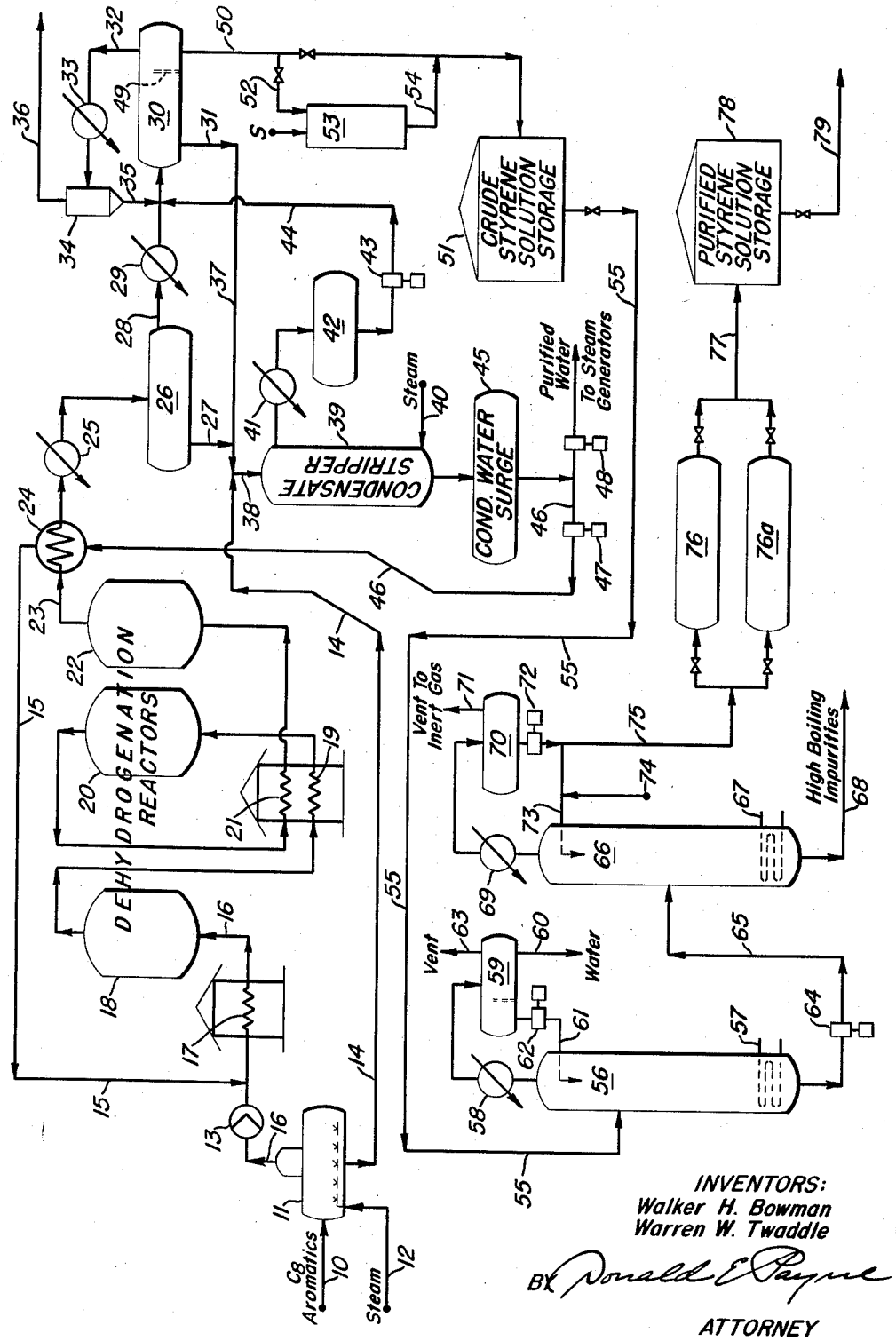

2,851,502

STYRENE PRODUCTION

Walker H. Bowman and Warren W. Twaddle, Hammond, Ind., assignors to Standard Oil Company, Chicago, Ill., a corporation of Indiana Application January 22, 1957, Serial No. 635,164

5 Claims. (Cl. 260—669)

This invention relates to an improved process for the commercial production of styrene in the form of a remarkably pure styrene-in-hydrocarbon solution from which the styrene may be directly polymerized to form molding grades of polystyrene without the necessity of ever separating the styrene monomer from solution.

Although it has heretofore been proposed (U. S. 2,376,709) to dehydrogenate ethylbenzene from a xylene solution thereof, prior proposals were not commercially successful; an object of this invention is to provide a practical commercial process which constitutes an improvement in many respects over prior proposals. A further object is to obtain styrene yields of the order of about 70 to 80 percent in a single pass while, at the same time, minimizing undesirable by-product formation. Another object is to provide a continuous auto-regenerative dehydrogenation process which can be maintained on stream and does not require interruption of charging stock flow for the purpose of effecting frequent catalyst regeneration. Still another object is to obtain a hydrocarbon solution of higher purity than has heretofore been obtainable. Other objects will be apparent as the detailed description of the invention proceeds.

In practicing the invention a $C_8$ aromatic hydrocarbon fraction containing about 10 to 50 percent and preferably about 20 to 40 percent of ethylbenzene is obtained, for example, from hydroformed naphtha by fractionation to eliminate higher and lower boiling components and extraction to eliminate hydrocarbons other than aromatics; the $C_8$ aromatic fraction is thus a solution of ethylbenzene in mixed xylenes which may have the approximate composition of 1:1:3 ortho-, para-, and meta-xylene. To each pound of this solution at least 2, and preferably about 2½ pounds of steam is added so that the total charge will contain at least 12, and preferably about 15 mols of steam per mol of solution. When lesser amounts of steam are employed, the activity of the dehydrogenation catalyst decreases rapidly with time and conversion to styrene is lowered. Ratios of steam to aromatics substantially greater than 2½ pounds per pound may be employed but they give little or no improvement in styrene yield. The steam may be added either to the cool liquid aromatic hydrocarbon mixture or to an aromatic charge which has been heated to a temperature above its vaporization point. Preferably, 100 pound steam is added directly to the mixed aromatic charge for obtaining steam-hydrocarbon mixture having a temperature of approximately 165° C., a substantial portion of the steam being obtained as "economizer steam" as will be hereinafter defined.

The dehydrogenation of the ethylbenzene is preferably effected in a plurality of heating-contacting stages wherein the mixture in each stage is heated to a temperature of about 700° C. and the contacting is effected with alkali-promoted iron oxide dehydrogenation catalyst at temperatures in the range of 680 to 700° C. and at pressures in the range of 30 to 100 p. s. i. g. with an over-all space velocity of about 1 to 2 pounds of hydrocarbon per hour per pound of catalyst. A relatively high pressure drop is employed across each reactor since it is desired that the time of contact in each stage be only about ¼ second and that the heating time in each stage be of the order of .2 second. If the contacting temperature falls below 670° C., the catalyst activity is unduly lowered and the catalyst may no longer be auto-regenerative. The catalyst is that generally known as "Shell 105" or "Shell 205" and it may consist of about 85 percent $Fe_2O_3$, 2 percent $Cr_2O_3$, 12 percent KOH and 1 percent NaOH, or of 90 percent $Fe_2O_3$, 4 percent $Cr_2O_3$ and 6 percent $K_2CO_3$; the catalyst compositions and the method of making same are disclosed in U. S. 2,408,140, 2,414,585, and 2,461,147. While these known commercial dehydrogenation catalysts are preferred, the invention is not limited thereto and other equivalent "steam-regenerative" dehydrogenation catalysts may be employed.

An important feature of our process is the immediate cooling of the final dehydrogenation effluent from about 680° C. to about 200° C. by use of an economizer or waste heat boiler which employs purified water produced in the system and generates economizer steam for admixture with initial charging stock. Effluent from the dehydrogenation step is then further cooled, first aqueous condensate is separated therefrom and the gas is still further cooled for separation of second aqueous and hydrocarbon condensates. Gas from the second separation step is refrigerated for condensing from fuel gas substantially all water and hydrocarbons higher boiling than benzene, this third condensate being returned to the second separation step. First and second aqueous condensates are steam stripped to remove hydrocarbons from purified water which is reused for steam production in the system. Overhead from the stripping zone is condensed to form a fourth condensate which is likewise returned to the second separation step from which an upper layer of styrene-in-hydrocarbon is separated and separately withdrawn.

The crude styrene solution may be stored as such, preferably after adding about 5 to 50 p. p. m. of sulfur as a polymerization inhibitor. Before it is employed for the preparation of polystyrene it is purified by being first passed through a stripping zone wherein its water content is decreased to less than 50 and preferably not more than about 10, e. g. 2 p. p. m. The dried solution is then fractionated to remove components higher boiling than $C_8$ aromatic hydrocarbons since certain of the higher boiling components such, for example, as phenylacetaldehyde have been found to contribute to color formation. The styrene solution is preferably passed through silica gel or equivalent adsorbent material which has the property of removing color bodies without causing styrene polymerization. The styrene may then be polymerized directly from the purified solution by means of finely divided sodium coupled with the use of an ether promoter for obtaining a high quality polystyrene suitable for molding.

The invention will be more clearly understood from the following detailed description of a specific example thereof read in conjunction with the accompanying drawing which is a schematic flowsheet of our improved system for the production of styrene.

While any source of ethylbenzene-containing $C_8$ aromatics may be employed, such aromatics are preferably extracted from hydroformed naphtha. A $C_8$ aromatic hydrocarbon fraction is thus obtained which is substantially free from other hydrocarbons and which may consist of about 20 to 30 percent ethylbenzene, the charge in this example being about 2,030 barrels per day (25,750 pounds per hour) of xylenes and 600 barrels per day (7,650 pounds per hour) of ethylbenzene. Said charge is introduced by line 10 at said rate and at a pressure of approximately 75 p. s. i. g. into vaporizer vessel 11 into which about 30,000 pounds per hour of 75 to 250 pound steam is introduced by line 12. The steam effects vaporization of the hydrocarbon charge and a preheating of the vapors to a temperature of approximately 160° C. If desired, a portion of the steam may be mixed directly with the hydrocarbon charge and the mixture may be indirectly contacted with the remainder of the steam in a heat exchange step, but the direct contact of all of the steam with the hydrocarbons in vessel 11 is more effective and is the preferred technique. This aromatic-steam mixture may be prepared at an even higher pressure in which case a pressure reducing valve 13 may be employed to reduce the pressure of the mixture to the range of about 50 to 100 p. s. i., e. g. 75 p. s. i. g. About 10,000 to 15,000 pounds per hour of the steam may be condensed in vessel 11 and this condensate may be withdrawn through line 14 to a condensate stripper which will be hereinafter described. Economizer steam from line 15 (also at about 75 p. s. i. or 160° C.) is admixed with the steam-hydrocarbon vapor mixture which leaves vessel 11 through line 16 so that the combined mixture contains at least 2 pounds and preferably at least 2½ pounds of steam per pound of hydrocarbon.

The dehydrogenation of the ethylbenzene is preferably effected in a three-stage adiabatic contacting system. In this example the steam-hydrocarbon mixture is heated in furnace tube 17 to a temperature of about 700° C. and immediately passed through a bed of steam-regenerative, alkali-promoted iron oxide catalyst in reactor 18 which may be about 9 feet in diameter by about 6 feet in height. The effluent from reactor 18 is heated in furnace tube 19 from about 680° back to 700° C. and the mixture is then passed through the second catalyst bed 20. Effluent from catalyst bed 20 is heated in furnace tube 21 from about 680 to 700° C. and passed through catalyst bed 22. Effluent from the final catalyst bed passes by line 23 through waste heat boiler or economizer 24 wherein the hot effluent is quickly cooled from about 680° C. to about 200° C. and steam is generated from purified water for admixture with incoming hydrocarbon vapors. The pressure drop through the heater coils and reaction vessels is preferably relatively large in order to obtain very high vapor velocity and extremely short contact times in the dehydrogenation system. The actual contact time in each reactor is of the order of about ¼ second and the contact time in each heating coil is only of the order of about .2 second. It is desirable to have the dehydrogenation outlet pressure of about 30 pounds in order to avoid the necessity of employing any gas compressor in the downstream portion of the system. Reactor flow may be downwards instead of upwards.

Effluent from the dehydrogenation step, after being cooled in economizer 24, is further cooled in condenser 25 to a temperature of about 90° C. and introduced into separator 26 from which a first condensate is withdrawn through line 27 and uncondensed gases are withdrawn through line 28. These latter gases are further cooled in condenser 29 to a temperature of the order of 40° C. and then passed into liquid-liquid-gas separator 30 from which a second water phase condensate is withdrawn through line 31 and a second uncondensed gas stream is taken overhead through line 32. The second uncondensed gas stream is cooled to about 5° C. in refrigerated cooler 33 and introduced into separator 34 from which third condensate is returned by line 35 for admixture with second condensate and uncondensed gases are withdrawn through line 36 as fuel gas.

Liquid condensates from lines 27 and 31 are introduced by lines 37 and 38 into condensate stripper 39 into which steam is introduced through line 40 in amounts required to strip hydrocarbons out of the condensate. The hydrocarbon-containing overhead gases are condensed in cooler 41 and introduced into receiver 42 from which fourth condensate is returned by pump 43 and line 44 for admixture with second condensate. Purified water from the base of the condensate stripper passes to surge tank 45. A part of the water from this surge tank is passed by line 46 and pump 47 to waste heat boiler or economizer 24 for the generation of steam by heat contained in dehydrogenation effluent. The rest of the purified water is discharged by pump 48 to other steam generators for the production of the process steam required in the system. Condensate from line 14 is also introduced into condensate stripper 39. This unique system reduces the amount of water which must be introduced from external sources for steam generation by maximizing the amount of purified water which can be utilized in steam generators for production of the process steam required in the system, with resultant savings in the cost of boiler feed water treatment.

An upper layer of styrene solution in separator 30 flows over baffle 49 and is withdrawn through line 50 to crude styrene solution storage vessel 51. Usually about 5 to 50 parts per million of sulfur is added to this crude styrene solution by passing a small stream thereof through line 52, sulfur saturating tank 53 and line 54, sulfur being introduced into tank 53 as required. While a small amount of sulfur is the simplest and most effective agent for stabilizing the syrene solution and avoiding styrene polymerization, other types of stabilizers may, of course, be employed. The crude styrene solution has substantially the following composition and rate of accumulation:

|  | Mol/hr. | #/hr. | B./s. d. |
| --- | --- | --- | --- |
| Xylene | 199 | 21,100 | 1,660 |
| Styrene | 53.9 | 5,620 | 443 |
| Ethylbenzene | 18.1 | 1,920 | 151 |
| Toluene | 24.6 | 2,260 | 178 |
| Benzene | 8.9 | 695 | 54 |
| Water | 6.4 | 116 | 8 |
| Total | 310.9 | 31,711 | 2,494 |

The fuel gas stream withdrawn through line 36 consists chiefly of hydrogen and carbon dioxide with minor amounts of oil and water and, on a volume basis, may contain about 76 percent hydrogen and 23 percent carbon dioxide, this stream being produced at the rate of about 5,500 pounds per hour.

The crude styrene solution requires purification before the styrene can be satisfactorily polymerized in said solution. For this purpose the crude solution is introduced by line 55 to stripping tower 56 which is provided with a conventional reboiler or heater 57 at its base for maintaining a bottom temperature of approximately 155° C., the stripper being operated with a top temperature of about 140° C. under a pressure of about 5 p. s. i. g. The overhead stream is condensed in cooler 58 and introduced into receiver 59 wherein water is separated and withdrawn through line 60, the condensed hydrocarbons being recycled through line 61 by pump 62 to serve as reflux in the top of the stripper and uncondensed material being vented through line 63. By carefully controlling the stripping conditions and particularly the pressure and the reflux rate, the water content of the solution may be substantially eliminated so the solution withdrawn from the bottom of the stripper contains only about 2 parts per million of water.

The dried solution is then passed by pump 64 and line 65 to fractionator 66 which is provided with reboiler or heater 67 for maintaining a bottom temperature of about 160° C., the upper part of the tower being maintained at about 155° C. and 5 p. s. i. g. About 2 percent of the total solution is usually withdrawn as bottoms through line 68 and it is important that the components higher boiling than $C_8$ aromatics be removed if it is desired to obtain an ultimate polystyrene which is substantially colorless. Overhead from fractionator 66 is condensed in cooler 69 and introduced into receiver 70 from which any uncondensed hydrocarbons may be vented through line 71. A portion of the condensate from receiver 70 is recycled by pump 72 and line 73 to serve as reflux in the fractionator and, if desired, a small amount of sulfur or other polymerization inhibitor may be introduced through line 74 to prevent polymerization in the upper part of the fractionator. The purified styrene solution is withdrawn through line 75 and it is preferably further purified by passing through a bed of silica gel or other solid adsorbent in one of the alternate vessels 76 and 76a before finally being delivered by line 77 to purified styrene solution storage tank 78. It has been found that percolation of the solution through silica gel at the rate of about 0.15 gallon per hour per pound of silica gel is effective for removing even traces of color bodies without causing polymerization of the styrene. Other solid adsorbents having this property of removing color bodies without causing polymerization may, of course, be used instead of silica gel.

The purified styrene solution is preferably stored in a nitrogen atmosphere and kept out of contact with atmospheric oxygen. In fact, vent line 71 preferably discharges into the nitrogen system. The purified styrene solution may be withdrawn through line 79 to polymerization vessels which are likewise blanketed with nitrogen and the styrene may be polymerized directly from the hydrocarbon solution by means of finely divided sodium and ether promoters. The sodium may be introduced as a sodium compound of diphenyl. The composition of the purified styrene solution and its rate of accumulation are substantially as follows:

|  | Mol/hr. | #/hr. | B./s. d. |
|---|---|---|---|
| Xylene | 195 | 20,700 | 1,630 |
| Styrene | 52.9 | 5,510 | 435 |
| Ethylbenzene | 17.7 | 1,880 | 148 |
| Toluene | 24.1 | 2,210 | 174 |
| Benzene | 8.7 | 680 | 53 |
| Total | 298.4 | 30,980 | 2,440 |

From the foregoing description it will be apparent that the objects of our invention have been attained. The use of a waste heat boiler or economizer for cooling dehydrogenation effluent is a vast improvement over the use of a product-charging stock heat exchanger. The use of a condensate stripper for removing hydrocarbons from purified water enables considerable savings in investment and operating cost with respect to boiler feed water preparation. The use of dehydrogenation pressures of at least about 20 to 30 p. s. i. g. enables considerable savings in investment and operating costs with respect to fuel gas separation. While the invention has been described in considerable detail with respect to a particular example, it should be understood that alternative arrangements and operating conditions will be apparent from the foregoing description to those skilled in the art.

We claim:

1. The method of making styrene which comprises contacting a 10 to 50 percent solution of ethylbenzene in mixed xylenes with about 75 to 250 p. s. i. g. steam to effect vaporization and preheating of the ethylbenzene-xylene solution, mixing with the vaporized solution a total amount of steam which is at least about 2 pounds per pound of hydrocarbon, a large part of the steam being "economizer steam," passing the mixture through a plurality of heating-contacting stages wherein the mixture in each stage is heated to a temperature of about 700° C. and the contacting is effected with alkali-promoted iron oxide dehydrogenation catalyst at pressures in the range of 100 to 30 p. s. i. g. and temperatures in the range of about 700° to 680° C. with an over-all space velocity of about 1 to 2 pounds of hydrocarbon per hour per pound of catalyst for producing dehydrogenation effluent, cooling said effluent by indirect heat exchange with purified water to generate said "economizer steam," further cooling the effluent in a plurality of stages and separating the cooled effluent into fuel gas, purified water for said steam generation and styrene-in-hydrocarbon solution.

2. The method of making styrene which comprises contacting a 10 to 50 percent solution of ethylbenzene in mixed xylenes with about 75 to 250 p. s. i. g. steam to effect vaporization and preheating of the ethylbenzene-xylene solution, mixing with the vaporized solution a total amount of steam which is at least about 2 pounds per pound of hydrocarbon, a large part of the steam being "economizer steam," passing the mixture through a plurality of heating-contacting stages wherein the mixture in each stage is heated to a temperature of about 700° C. and the contact is effected with alkali-promoted iron oxide dehydrogenation catalyst at pressures in the range of 100 to 30 p. s. i. g. and temperatures in the range of about 700° to 680° C. with an over-all space velocity of about 1 to 2 pounds of hydrocarbon per hour per pound of catalyst, for producing dehydrogenation effluent, the total contacting time with catalyst not substantially exceeding 1 second and the total heating time at temperatures of the mixture above 500° C. being less than about 1 second in the heating-contacting stages, cooling the effluent from the final heating-contacting stage by indirect heat exchange with purified water to generate said "economizer steam," further cooling the effluent in a plurality of stages and separating the cooled effluent into fuel gas, purified water for said steam generation and styrene-in-hydrocarbon solution.

3. The method of making styrene which comprises contacting a 10 to 50 percent solution of ethylbenzene in mixed xylenes with about 75 to 250 p. s. i. g. steam to effect vaporization and preheating of the ethylbenzene-xylene solution, mixing with the vaporized solution a total amount of steam which is at least about 2 pounds per pound of hydrocarbon, a large part of the steam being "economizer steam," passing the mixture through a plurality of heating-contacting stages wherein the mixture in each stage is heated to a temperature of about 700° C. and the contacting is effected with alkali-promoted iron oxide dehydrogenation catalyst at pressures in the range of 100 to 30 p. s. i. g. and temperatures in the range of about 700° to 680° C. with an over-all space velocity of about 1 to 2 pounds of hydrocarbon per hour per pound of catalyst for producing dehydrogenation effluent, cooling said effluent by indirect heat exchange with purified water to generate said "economizer steam," further cooling the effluent, after the indirect heat exchange step, to a water-condensing temperature, separating first aqueous condensate from uncondensed gas, further cooling the uncondensed gas to substantially lower temperature, separating a second uncondensed gas from a second aqueous condensate, refrigerating the second uncondensed gas to effect condensation of substantially all water and hydrocarbons higher boiling than benzene as a third condensate, stripping the first and second aqueous condensates with steam to obtain purified water, condensing the overhead from the stripping step to form a fourth condensate and recovering styrene-in-hydrocarbon solution from admixed condensates after removal of water therefrom.

4. The method of making styrene which comprises contacting a 10 to 50 percent solution of ethylbenzene in mixed xylenes with about 75 to 250 p. s. i. g. steam to effect vaporization and preheating of the ethylbenzene-xylene solution, mixing with the vaporized solution a total amount of steam which is at least about 2 pounds per pound of hydrocarbon, a large part of the steam being "economizer steam," passing the mixture through a plurality of heating-contacting stages wherein the mixture in each stage is heated to a temperature of about 700° C.

and the contacting is effected with alkali-promoted iron oxide dehydrogenation catalyst at pressures in the range of 100 to 30 p. s. i. g. and temperatures in the range of about 700° to 680° C. with an over-all space velocity of about 1 to 2 pounds of hydrocarbon per hour per pound of catalyst for producing dehydrogenation effluent, cooling said effluent by indirect heat exchange with purified water to generate said "economizer steam," further cooling the effluent in a plurality of stages, separating the cooled effluent into fuel gas, purified water for said steam generation and styrene-in-hydrocarbon solution, reducing the water content of the styrene-in-hydrocarbon solution to not more than about 10 parts per million, distilling the dried solution to remove components higher boiling than $C_8$ aromatics and to remove in vapor form hydrocarbons substantially lower boiling than benzene, and charging to a holding vessel a substantially pure solution of styrene in aromatic hydrocarbons.

5. The method of making styrene which comprises contacting a 10 to 50 percent solution of ethylbenzene in mixed xylenes with high pressure steam to effect vaporization and preheating of the ethylbenzene-xylene mixture, the total amount of steam being at least about 2 pounds per pound of hydrocarbon and a large part of the steam being "economizer steam," passing the mixture through a plurality of heating-contacting stages wherein the mixture in each stage is preheated to a temperature of about 700° C. and the contacting is effected with alkali-promoted iron oxide dehydrogenation catalyst at pressures in the range of 100 to 30 p. s. i. g. and temperatures in the range of about 700 to 680° C. with an over-all space velocity of about 1 to 2 pounds of hydrocarbon per hour per pound of catalyst for producing dehydrogenation effluent, cooling said effluent for indirect heat exchange with purified water to generate said "economizer steam," further cooling said effluent to a temperature below that required for condensing water and separating a first condensate from a first gas stream, cooling the gas stream to a lower temperature and introducing it into a separating zone for separating a second condensate from a second gas stream, refrigerating the second gas stream for obtaining a third condensate and returning the third condensate for admixture with the second condensate, introducing first and second aqueous condensates to a condensate stripping zone and therein stripping said condensates with steam to obtain said purified water and an overhead stream which is condensed and returned to the second condensate, separating a styrene-in-hydrocarbon solution from the second condensate, adding about 5 to 50 parts per million of sulfur to said stream, stripping said stream to reduce its water content below about 50 parts per million, fractionating the dried solution to remove components higher boiling than $C_8$ aromatics and to remove as vapors hydrocarbons lower boiling than benzene, and storing purified styrene-in-hydrocarbon solution for direct polymerization of styrene therefrom for the formation of molding grade polystyrene.

References Cited in the file of this patent

UNITED STATES PATENTS

| 2,376,709 | Mattox | May 22, 1945 |
| 2,752,405 | Happel et al. | June 26, 1956 |
| 2,813,137 | Twaddle et al. | Nov. 12, 1957 |

FOREIGN PATENTS

| 477,499 | Canada | Oct. 2, 1951 |
| 737,881 | Great Britain | Oct. 5, 1955 |

OTHER REFERENCES

Boundy-Boyer: Styrene, 1952, Reinhold Pub. Co., New York, N. Y. (pp. 35–39 relied on).